United States Patent
Swaringim et al.

(10) Patent No.: US 12,508,833 B2
(45) Date of Patent: Dec. 30, 2025

(54) DRIPLIP

(71) Applicants: Harold Swaringim, O'Fallon, MO (US); Michael Swaringim, O'Fallon, MO (US)

(72) Inventors: Harold Swaringim, O'Fallon, MO (US); Michael Swaringim, O'Fallon, MO (US)

( * ) Notice: Subject to any disclaimer, the term of this patent is extended or adjusted under 35 U.S.C. 154(b) by 0 days.

(21) Appl. No.: 18/409,502

(22) Filed: Jan. 10, 2024

(65) Prior Publication Data

US 2024/0140135 A1    May 2, 2024

Related U.S. Application Data

(63) Continuation-in-part of application No. 17/379,040, filed on Jul. 19, 2021, now abandoned.

(60) Provisional application No. 63/053,858, filed on Jul. 20, 2020.

(51) Int. Cl.
*B44D 3/12*    (2006.01)

(52) U.S. Cl.
CPC .................................. *B44D 3/128* (2013.01)

(58) Field of Classification Search
CPC ........................................................ B44D 3/128
USPC ............................................... 220/701, 702
See application file for complete search history.

(56) References Cited

U.S. PATENT DOCUMENTS

| | | | | |
|---|---|---|---|---|
| 5,626,258 A | * | 5/1997 | Maiorino | B65D 25/38 |
| | | | | 220/699 |
| D419,874 S | * | 2/2000 | Smith | D9/440 |
| 2008/0251525 A1 | * | 10/2008 | Fontaine | B44D 3/121 |
| | | | | 220/756 |
| 2022/0110474 A1 | * | 4/2022 | Vaona | A47J 31/4428 |

OTHER PUBLICATIONS

Delonghi, Eletta Explore Espresso Machine, company website, Aug. 5, 2025, DeLonghi, Italy.

* cited by examiner

*Primary Examiner* — Stephen J Castellano
(74) *Attorney, Agent, or Firm* — Charles McCloskey

(57) ABSTRACT

The DripLip has a round shape that fits upon a paint can and retains drips and dribbles. The invention has an upper flange upon a main wall that descends to a lower flange perpendicular to the main wall. Upon a part of the lower flange, the invention has a receptacle with a lower portion and an upper portion upon it. The lower portion has a rectangular cross section. Then the upper portion of the receptacle has an inclined forward wall extending Outward from the receptacle and the rest of the invention. The upper portion opens into the plane of the lower flange. The upper portion and the lower portion both of the receptacle retain the liquid remaining from a typical pour from the paint can.

12 Claims, 4 Drawing Sheets

DRIPLIP

CROSS-REFERENCE TO RELATED APPLICATION

This continuation in part application claims priority to the pending non-provisional application Ser. No. 17/379,040 filed on Jul. 19, 2021 which claims priority to the provisional application Ser. No. 63/053,858 filed on Jun. 20, 2020, and all applications have common inventors and are owned by the same inventors.

BACKGROUND OF THE INVENTION

The present invention relates to painting equipment in general and more particularly to equipment that reduces spillage and increases drip collection.

Pouring paint from an existing one gallon can and other sizes of containers into a paint tray often leads to paint filling a lid channel in the can or other container. If the lid channel lacks thorough cleanliness, the lid will not seat properly into the channel. With a partly unsealed container, painters become unable to store paint for long periods of time without ruining the paint left in the can or other container. As homeowners and less skilled painters have experienced, placing a lid upon a channel with residual paint in it causes the paint to squirt from beneath the lid, leaking over the side of a can, to waste paint, and to make a mess, often unexpectedly.

From before the pyramids of Egypt, people have put their mark on walls, ceilings, and a host of other places. Early markings had substances of nearby origin often made on the spot as near cave paintings. In time, people became painters, and their substances of marking became paints of wide variety. From the pharaohs to the nobles of the Enlightenment, painters followed the vision of their patrons in their artistic endeavors. Some endeavors became masterpieces such as the works of Michelangelo. Master painter Michelangelo depicted human forms in a host of activities often upon ceilings of chapels. Michelangelo, as with other painters, put paints upon his palette for later use on plaster or canvas, tile, and stucco to name a few substrates.

Flowing from the work of artists, paint also appears on buildings. Paint seals a surface and protects that surface as well as the structure beneath from moisture, sun, and the elements. Within a structure, paint serves its protective purpose but also improves the ambience with color and patterns. Use of paint faces its only limit of human creativity. As paint applies to structures, structures may have vast surfaces, such as walls, ceilings, and floors. Such surfaces call for a volume of painter greater than an artist's palette can hold.

Throughout this application, where a masculine pronoun is used, the feminine pronoun is implied.

DESCRIPTION OF THE PRIOR ART

With artists' palettes insufficient for large painting, painters adapted buckets and tubs over the recent centuries. Such storage implements came from nearby water supply wells, barns, and stalls. These buckets and tubs often remained open during and after use. That led to spoilage of paint and prompted painters to use just what they needed for a job. Larger volumes of paint came from barrels but still subject to drying and wasting impediments.

Following developments first in steel making and then in polymers, painters insisted upon better storage containers for their paints, stains, varnishes, sealants, and the like. Buckets and tubs acquired lids and then the manufacturers developed metal cans and ultimately polymer plastic buckets. Painters, particularly in residential settings, took a shine to one gallon cans. Such cans had an all metal construction for many decades. In recent years, one-gallon paint cans have retained their steel lids but upon polymer closed bottom cylinders. In larger residential and many commercial settings, painters use five gallon or larger containers. Such larger containers provide much paint for use to a skilled painter and also supply spraying equipment.

Returning to the humble paint can, a painter, whether professional, semi-professional as a decorator, or a homeowner, has to pour paint from the can into a tray, especially for rolling. Rolling, as we remember, covers a large surface promptly. The tray provides a pitched surface upon which a painter wets the roller in paint for its application to a wall, a ceiling, a floor, a door, and the like. But the painter must still pour the paint. Though paint flows as a liquid, its various viscosities cause it to behave differently from can to can and from water itself. A painter must exercise care when pouring paint from a can.

Alas, even the most skilled painter, let alone homeowners, may spill paint during a pour. The painter tips the can abruptly upward and the paint dribbles down the can. The painter tips the can inattentively and the paint dribbles down the can. The painter tips the can slowly and the paint dribbles outside the tray, upon the drop cloths if present, and then a nearby floor. An astute painter reacts, and takes care of the spill promptly.

Suppliers have provided various lid covers to minimize spillage. The covers fit upon a paint can and provide a spout. Some existing covers accept a metal lid upon them where the lid came from the original paint can. These existing covers nobly guide the pour of paint from a can. But a painter must still show attention to a paint can with an existing cover lest a drip or two escape from the cover. Try as they might, painters still face a risk of dribbles of paint up to outright spills of large portions from a paint can during a moment of distraction or inattention.

Though the preceding description has referred to containers, paint cans, trays, and covers, the description also applies to buckets, jugs, jars, boxes, and related paint storage devices with a round opening for dispensing paint, varnish, stains, and the like liquids. While the above-described devices fulfill their respective, particular objectives and requirements, the aforementioned devices do not describe The DripLip. Therefore, a need exists for new and improved The DripLip that can be used for collecting paint and preventing drips and dribbles. In this regard, the present invention substantially fulfills this need. In this respect, The DripLip according to the present invention substantially departs from the conventional concepts and designs of the prior art, and in doing so provides a device primarily developed for the purpose of storing paint from the nappe and ogee of a pour paint and other fluids from a can.

The DripLip overcomes the above-mentioned disadvantages and drawbacks of the prior art. As such, the general purpose of the present invention, which will be described subsequently in greater detail, is to provide new and improved The DripLip which has all the advantages of the prior art mentioned heretofore and many novel features that result in The DripLip which are not anticipated, rendered obvious, suggested, or even implied by the prior art, either alone or in any combination thereof.

SUMMARY OF THE INVENTION

The DripLip has a round shape that fits upon a paint can and collects paint after pouring from the paint can. It also retains drips and dribbles during pouring and ordinary usage. The invention has an upper flange upon a main wall that descends to a lower flange perpendicular to the main wall. Upon a portion of the lower flange, the invention has a receptacle with vertically stacked portions. The lower portion has a generally rectangular cross section. Then upon a the lower portion of the receptacle, an upper portion has a greater width than the lower portion and extends Outward from the lower portion and the rest of the invention. The upper portion of the receptacle has an inverted generally triangular cross section. The upper portion of the receptacle opens into the plane of the lower flange. The lower portion of the receptacle and the upper portion of the receptacle retain the liquid remaining from a typical pour from the paint can.

The present invention provides painters with an improved paint can cover fitting over a standard paint can, preventing the channel in the rim of the can from filling with paint, and thus prevents leaks and spills because of excess paint exuding from the channel, leaking, and making a mess once more. The present invention also protects the airtight seal of the lid to the channel of the can as it allows for forming the airtight seal again when reinstalling the lid after use of the paint can, ensures the quality of the paint lasts for later use, and includes a circular continuous opening that allows the painter to access the paint or other liquid within the can, or other container. The present invention provides a more convenient and effective method of preserving leftover paint with minimal mess.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and devices for carrying out the several purposes of the present invention. It is important, therefore, that the claims be regarded as including such equivalent constructions insofar as they do not depart from the spirit and the scope of the present invention.

It is therefore an object of the present invention to provide a new and improved The DripLip that may be easily and efficiently manufactured and marketed to the consuming public.

Still another object of the present invention is to provide The DripLip that fits upon existing one-gallon size paint cans.

Still another object of the present invention is to provide The DripLip that fits upon a rim adapted from a one-gallon size paint can.

Still another object of the present invention is to provide The DripLip that retains paint in an amount compatible with ninety percent of the nappes from one-gallon paint cans after pouring from them has stopped.

Still another object of the present invention is to provide The DripLip that fits over the existing lid channel of a one-gallon paint can.

Still another object of the present invention is to provide The DripLip that has a detachable centerpiece.

Still another object of the present invention is to provide The DripLip that has at least one ribbed or knurled grip upon a shelf portion of a flange suitable for gripping by a painter's fingers.

Still another object of the present invention is to provide The DripLip that has one centered guide to visually remind a painter the direction to tip a paint can and to physically urge a nappe of paint in the direction of pour, ultimately to a nearby tray or other container.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
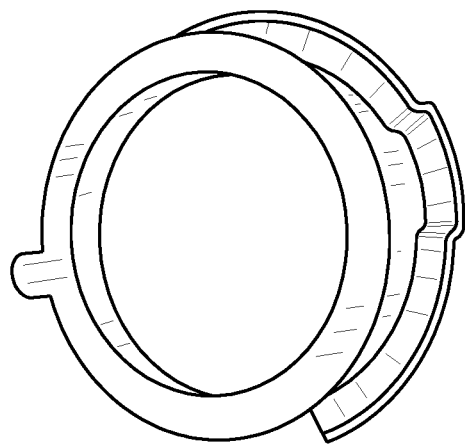
FIG. 1 is an overhead perspective view of an alternate embodiment of the present invention.

Referring now to the drawings, and particularly to FIGS. 1-12, a preferred embodiment of the DripLip of the present invention is shown by the reference numeral 1.

The following description of FIGS. 1-5 presents a simplified summary in order to provide a basic understanding of some aspects of the disclosed invention. This summary is not an extensive overview, and it is not intended to identify key and critical elements and to delineate the scope thereof.

Its sole purpose is to present some concepts in a simplified form as a prelude to the more detailed description that presents later in FIGS. 6-12.

The DripLip takes the form of a modified paint can cover. Though this description refers to paint, a panoply of fluids may also see use from this invention. Though the word paint sees plenty of usage in this description other fluids are anticipated. The present invention has a generally circular disposable and lightweight polymer, or plastic, cover that prevents the channel of a paint can from filling with paint prevents paint from spilling onto the surrounding area near the can and wasting unused paint. The DripLip covers the lid channel of a paint can and partially lines the interior beneath the lid channel. The present invention also has its generally circular continuous opening that allows a user to access the paint or other liquid within the can. A painter can pour additional paint, if needed, without worry of filling the lip of the can with excess paint. The spill prevention ensures all leftover paint can see a future use without mess and waste. Though this description refers to a painter, the word anticipates other users for the invention such as artists, roadway stripers, decorators, and the like.

Figure 2:
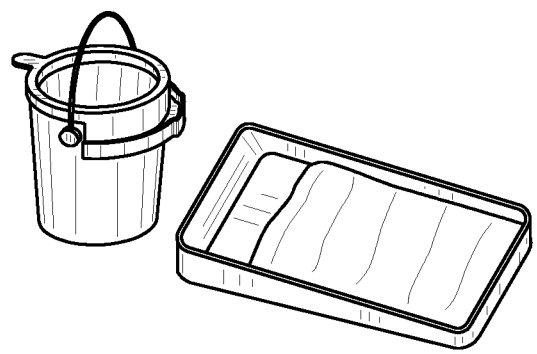
FIG. 2 is a perspective view of the alternate embodiment in use.
Figure 3:
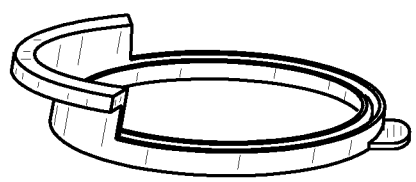
FIG. 3 is an inverted side view of the alternate embodiment.
Figure 4:
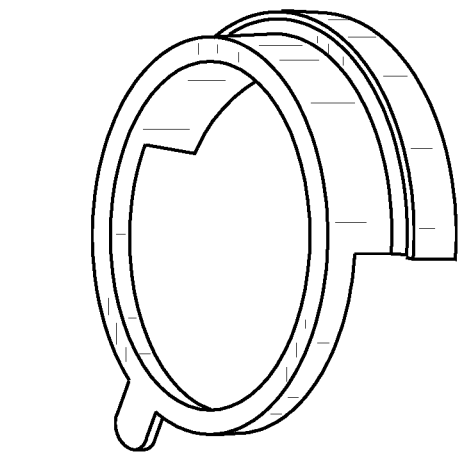
FIG. 4 is an overhead perspective view of the alternate embodiment.
Figure 5:
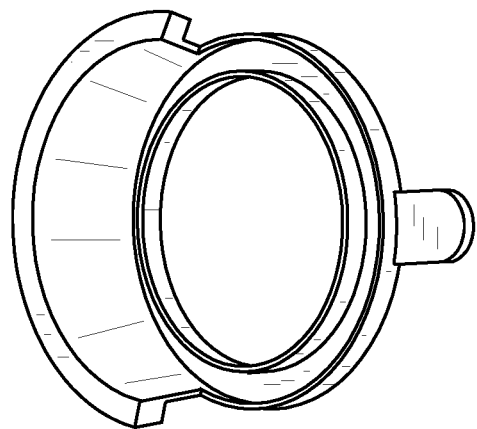
FIG. 5 is an inverted perspective view of the alternate embodiment.

As happens, exact size, measurements, construction, design, and specifications may vary during later development and manufacturing of the present invention. FIGS. 1-5 show the device of the present invention from multiple views, including perspectives. FIG. 1 is an overhead perspective view of an alternate embodiment of the present invention 1. FIG. 2 is a perspective view of the alternate embodiment of the invention 1 in use upon a paint can C adjacent to a tray T. FIG. 3 is an inverted side view of the alternate embodiment of the invention 1. FIG. 4 is an overhead perspective view of the invention's, as at 1, alternate embodiment. FIG. 5 is an inverted perspective view of the alternate embodiment of the invention 1 partially opposite that of FIG. 4.

Figure 6:
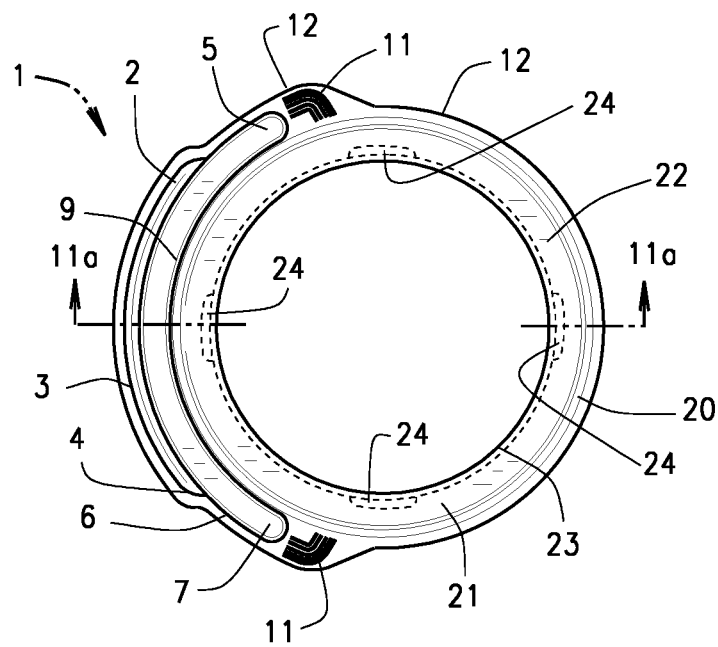
FIG. 6 is a top view of the invention.

Turning to FIG. 6 showing a top view of the invention, the invention 1 has a round upper flange 22 with a width generally less than an outer diameter of the upper flange. The upper flange has an annular form when viewed from above. The narrow width of the upper flange allows for placement of a lid during manufacturing, shipping, storage, and eventual sale of the invention, The DripLip. During usage, the upper flange lays flat upon a lid channel of a paint can and makes contact upon the entire circumference of the lid channel. Upon removing the lid, the invention appears as shown. The upper flange has an inside diameter and an outside diameter greater than the inside diameter. Upon the interior of the upper flange, the upper flange has an inner rim 23 at the inside diameter. The inner rim has at least three, here showing four, tabs 24 beneath it upon the interior face of the main wall, also see FIG. 11*a*, supra. The tabs permit a grasp of the invention upon a paint can beneath a lid channel, as later shown in FIG. 12. Opposite the inner rim, the upper flange 22 has its outer edge 21 at the outside diameter. The outer edge and the inner rim make the upper flange have a generally annular form. Descending from the outer edge 21, the invention has its main wall 20 generally of a cylindrical form of the outside diameter of the upper flange 22. The main wall has its height into the plane of this figure. In support of nesting, the main wall attains a frustoconical shape. The inner rim, the upper flange, the outer edge, and the main wall cooperate so that The DripLip fits snugly upon the existing lid channel at the top of an existing paint can.

The main wall flares Outward spaced below the upper flange and into a lower flange 10. The lower flange 10 extends Outward from the main wall around the invention upon a plane perpendicular to the main wall 20. Presuming a paint can to the left of the figure, the lower flange approaches a presumed paint can to within ninety degrees of rotation from the center of the invention. Towards the top and to the left of the figure, the lower flange widens to at least double its previous diameter for a grip 11 upon a shelf 12 with the grip formed of ridges, ribs, or knurling, as shown though alternate surface textures are foreseen to aid a painter. The lower flange rotates beyond the grip 11, here, counterclockwise, to a shelf 12. Alternatively, the shelf has the same width as the grip but without surface texture. In rotation away from the shelf, the lower flange then starts a receptacle 5 that further extends into the plane of this figure beyond that of the lower flange. The receptacle extends Outward from the main wall 20 and from the center of the invention. The receptacle has an arcuate form that follows the curvature of the main wall 20. As later shown in FIG. 11*a*, the receptacle has a lower portion as at 2B—as in Below—and an upper portion as at 2 stacked vertically upon it. The lower portion has its width, generally constant, and its depth generally constant. The lower portion's width and depth cooperate to form a rectangular shaped cross section. Further in counterclockwise rotation along the receptacle, the upper portion as at 2 extends radially Outward in width from the lower portion 2B of the receptacle. The upper portion 2B extends for at least one half of the length of the lower portion but less than the full length of the receptacle. The upper portion also follows the curvature of the main wall, and it has an arcuate form that follows the lower portion of the receptacle. The upper portion 2 and the receptacle 5 continue in rotation towards the lower left of the figure. In an alternate embodiment, the invention substitutes chamber for receptacle.

The upper portion 2 has a forward wall 3 bending outward from the rest of the invention, that is, outward from the center of the invention. The forward wall has a bend to show its curved shape to increase volume within the upper portion for retaining liquid. Along with bending, the forward wall may incline or tip. The forward wall imparts to the upper portion, a flat shape, or preferably a curved shape, from the plane of the lower flange 10 downwardly, that is, towards the rest of the receptacle 5. The forward wall forms the upper portion at a radial wall 4. The radial wall has a generally inverted triangular shape extending from the lower flange to the receptacle, particularly its lower portion 2B, as later shown. The lower edge of the forward wall and the inside edge of the radial wall join to an outer wall 6 forming the exterior of the receptacle. The outer wall descends beneath the upper portion 2 to a base 8 as later shown in FIG. 7. The outer wall continues further in rotation from the radial wall and has a greater height away from the radial wall. The outer wall extends from the lower flange 10 into the plane of the figure. The outer wall continues and follows the curvature of the main wall 20 to a rounded end 7 denoting the terminus of the receptacle 5 and the outer wall has an arcuate form. The rounded end curves inwardly to an inner wall 9 that defines an inner boundary of the receptacle 5 inward from the upper portion 2 of the receptacle and the outer wall 6. The inner wall 9 defines the length of the receptacle 5 as it spans between the shelves 12 just outside the grips 11. The shelves are mutually spaced apart and outward from the receptacle as shown. The inner wall also extends from the lower flange 10 into the plane of the figure and defines the height of the receptacle. The height of the receptacle comes from the upper portion stacking vertically upon the lower portion, both of the receptacle, as later shown in FIG. 11*a*.

The height of the receptacle exceeds that of the upper portion as shown. Preferably, the invention has single axis symmetry centered upon the upper portion as at the forward wall. As the invention has that symmetry, the preceding description applies to both the grips, tabs, rounded ends, and the upper portion of the receptacle, the lower portion of the receptacle and the receptacle as a unit, forward wall, radial walls, outer wall, and inner wall as shown in the top and bottom of the figure. In an alternate embodiment, the upper portion of the receptacle functions as a spout, directing liquid flow out of a paint can, and as needed liquid flow into a paint can.

Figure 7:
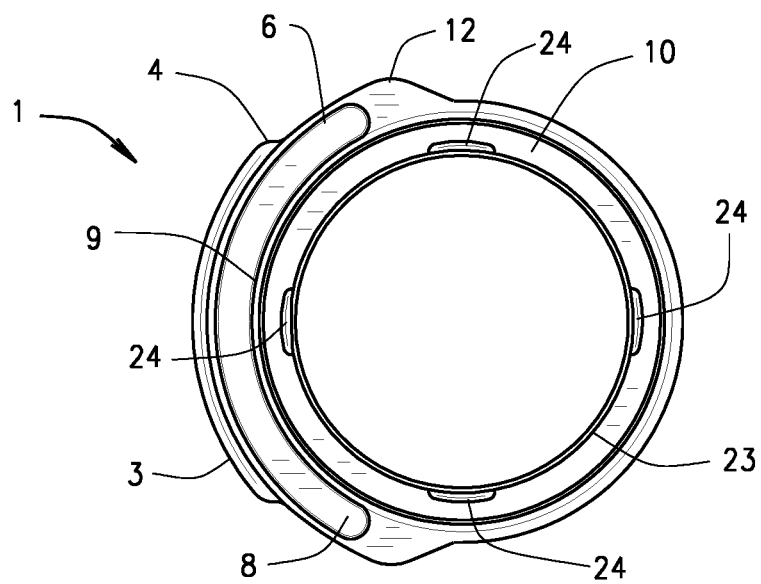
FIG. 7 is a bottom view of the invention.
Figure 8:
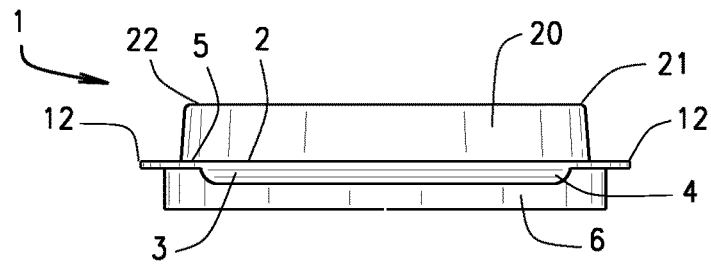
FIG. 8 is a front view of the invention.

Turning the invention 1 over, FIG. 7 shows a bottom view of it, that is, without a nearby paint can. In the background towards the center of the figure, the invention has its inner rim 23 generally round. In an alternate embodiment, the invention has four tabs 24 symmetrically spaced about the inner rim of the upper flange. Outward from the inner rim, the lower flange 10 extends at the plane of this figure. Towards the left of the figure, the lower flange 10 has the two tabs 12 equally spaced apart in rotation, that is, to the left and to the right of the receptacle, as seen in FIGS. 6, 8, and generally symmetric about the center of the forward wall 3. Within the tabs, the figure shows the base 8 of curved form following the curve of the main wall 20 previously shown. The base has a generally flat form in the foreground of this figure. The base has the inner wall 9, the rounded ends 7, and the outer wall 6 beneath it and extending to the lower flange 10. Centered upon the base and shown towards the left, the forward wall 3 of the upper portion 2 appears. The forward wall extends from the outer wall below the base in this figure upwardly toward the lower flange. The forward wall has the two radial walls 4 flanking it, that is mutually spaced apart in rotation about the center of the invention. The forward wall, the outer wall, the inner wall, the receptacle (including its upper portion and its lower portion), the main wall and the outer edge each have a slight angular orientation or bevel that permits nesting of a plurality of the invention. To further promote nesting, the invention has its main wall 20 forming a frusto-conical shape.

Ready to paint? FIG. 8 shows a front view of the invention just before paint or other liquid may flow over it. With a painter tipping the can, the paint would flow generally centered upon the inner rim 23 and over the upper flange 22. The paint flows over the upper flange outward and reaches the outer edge 21 that encircles the upper flange as previously shown. The outer edge has a curved form and transitions downwardly to the main wall 20 at a slight bevel to the plane of the outer edge. The main wall extends around the other edge and thus displays a somewhat trapezoidal shape in this figure. The main wall descends to the lower flange 10 with its two spaced apart grips 11 extending outermost in this view. Below the grips 11, the outer wall 6 descends forming the receptacle 5 spanning from left to right in this figure. Centered upon the outer wall 6, the upper portion 2 communicates behind the forward wall 3 into the rest of the receptacle. The radial walls 4 cabin the forward wall 3 forming the upper portion within them.

Done painting? When the painter concludes, or finishes, pouring paint, the painter tips the can upward and residual paint, or other liquid, collects in the upper portion of the receptacle and the lower portion of the receptacle. The receptacle has both portions cooperate to mutually retain paint or other liquid.

Figure 9:
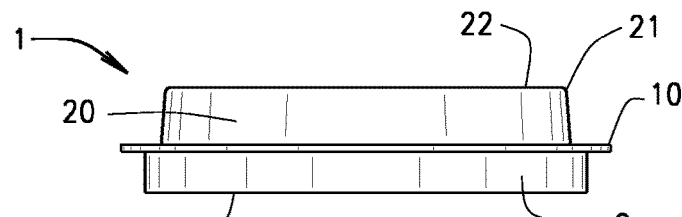
FIG. 9 is a back view of the invention.

Turning the invention 1, FIG. 9 shows a back view as a painter would see the invention during tipping of a paint can with the invention upon it. The DripLip has its upper flange 22 around the invention denoted by the outer edge 21. Depending from the outer edge 21 in this view, the invention has the main wall 20 that wraps around the invention at an obtuse angle to the plane of the upper flange. The angle of the main wall permits nesting of the invention. The main wall then merges into the lower flange 10 where the lower flange generally has parallel orientation to the upper flange. Beneath the lower flange in this view, the receptacle 5 descends and shows the inner wall 9 approaching and merging into the base 8 opposite the upper flange. The receptacle extends left to right in this figure at slightly less than the diameter of the invention.

Turning the invention ninety degrees in rotation from the view of FIG. 9, FIG. shows a side view of The DripLip with the forward wall 3 towards the left. With the lower flange 10 here shown in a horizontal orientation, the invention may have seen use and may store paint or other liquid within the upper portion 2 and the lower portion 2B of the receptacle 5. The lower flange 10 has a grip 11 left of center and the main wall 20 extending upwardly from it at an angle suitable for nesting the invention. The main wall reaches its height and merges with the other edge 21. The other edge has the upper flange 22 within it.

Below the lower flange 10, the upper portion 2B towards the left has its forward wall 3 extending downwardly and inwardly. The forward wall merges with the radial wall 4 here show in its triangular shape. The radial end then merges into the outer wall 6 of the receptacle 5. The outer wall then extends downwardly from the lower flange as it curves to follow the lower flange. The outer wall merges into the base 8 at an angle suitable for nesting. The base has a generally flat orientation, here shown parallel to the lower flange. The outer wall curves to the right and merges with the rounded end 7. The round end spans from the base up to the lower flange as shown.

Figure 10:
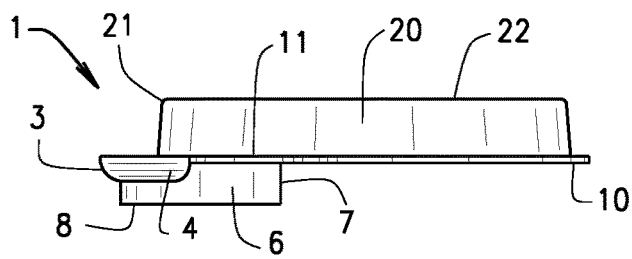
FIG. 10 is a side view of the invention.
Figure 11:
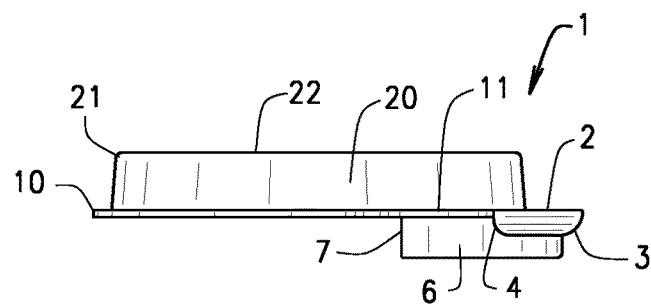
FIG. 11 is a side view of the invention.

Turning the invention ninety degrees in rotation from the view of FIG. 9 oppositely from that of FIG. 10, FIG. 11 shows a side view of The DripLip with the forward wall 3 towards the right. As described in FIG. 10, the invention has its lower flange 10 supporting the main wall 20, outer edge 21, and upper flange 22 above it. Below the lower flange, the forward wall 3 and the radial walls 4 form the upper portion 2 that communicates into the receptacle 5. The receptacle 5 forms within the outer wall 6 upon the base 8 and cabined with the rounded ends 7. The lower flange has a perpendicular orientation to the receptacle.

Figure 11A:
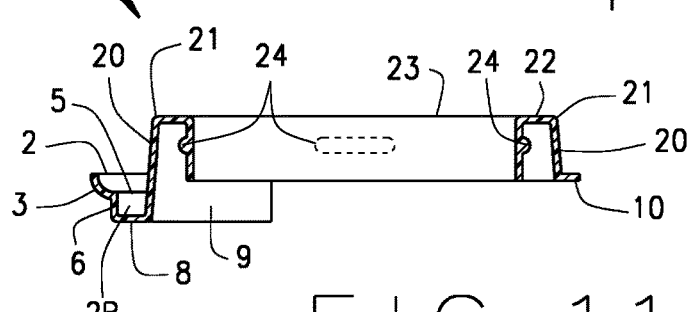
FIG. 11a is a section view of the invention.

Let's explore how the upper portion 2 communicates within the receptacle 5 for collecting and storing drips and dribbles of paint or other liquid in the sectional view of FIG. 11*a*. From the left of the figure, The DripLip begins with the lower flange here at its most forward orientation beneath the center over which the paint flows out during pouring and this collects upon returning a can and the invention upright. From the lower flange, the forward wall 3 descends at a near acute angle and inward to the outer wall 6. The outer wall descends further to the base 8 reaching the maximum height of the invention. The base extends inward again to the inner wall. The inner wall has a spaced apart position from the outer wall and the forward wall. In this view, the inner wall and the outer wall have slight mutually outward angles to permit nesting of the upper portion and the lower portion of the receptacle.

The inner wall continues upwardly from the base to the lower flange 10 and transition to the main wall 20. The main wall extends further upward to the outer edge 21 that has a curved transition, or rounds over, to the upper flange 22 at the maximum height of the invention. The upper flange has an obtuse angle to the main wall that permits nesting. The upper flange curves around the invention as previously shown. Along the main wall, the upper flange has the inner rim 23 that has tabs 24 beneath it. The tabs assist in gripping the paint can, beneath the lid channel, during usage of the invention. More precisely, the tabs 24 have locations equally spaced—equiangular—upon the interior face of the main wall 20 and below the inner rim 23. The inner rim continues toward the right of the figure to another portion of upper flange 22 opposite the forward wall 3. The main wall 20 descends from the outer edge 21 to the lower flange 10 on the far right of the figure. The lower flange portions on the left and the right of this figure have a coplanar orientation. Preferably, the inner rim 23 and the outer edge 21 have a rounded form that guides liquid, such as paint, in the upper portion and lower portion of the receptacle. The rounding of the inner rim and the outer edge provide a smooth transition of the upper flange to both of them and liquid flowing out of the invention has little turbulence imparted to it. The forward wall, the outer wall, the inner wall, the upper portion and the lower portion of the receptacle, and the main wall each have a slight angular orientation or bevel that permits nesting of a plurality of the invention. To further promote nesting, the invention has its various walls, such as the main wall 20, forming a frusto-conical shape. The various walls and edges have an outward angular orientation as shown in this figure that permits nesting of one The DripLip upon a stack of others.

Figure 12:
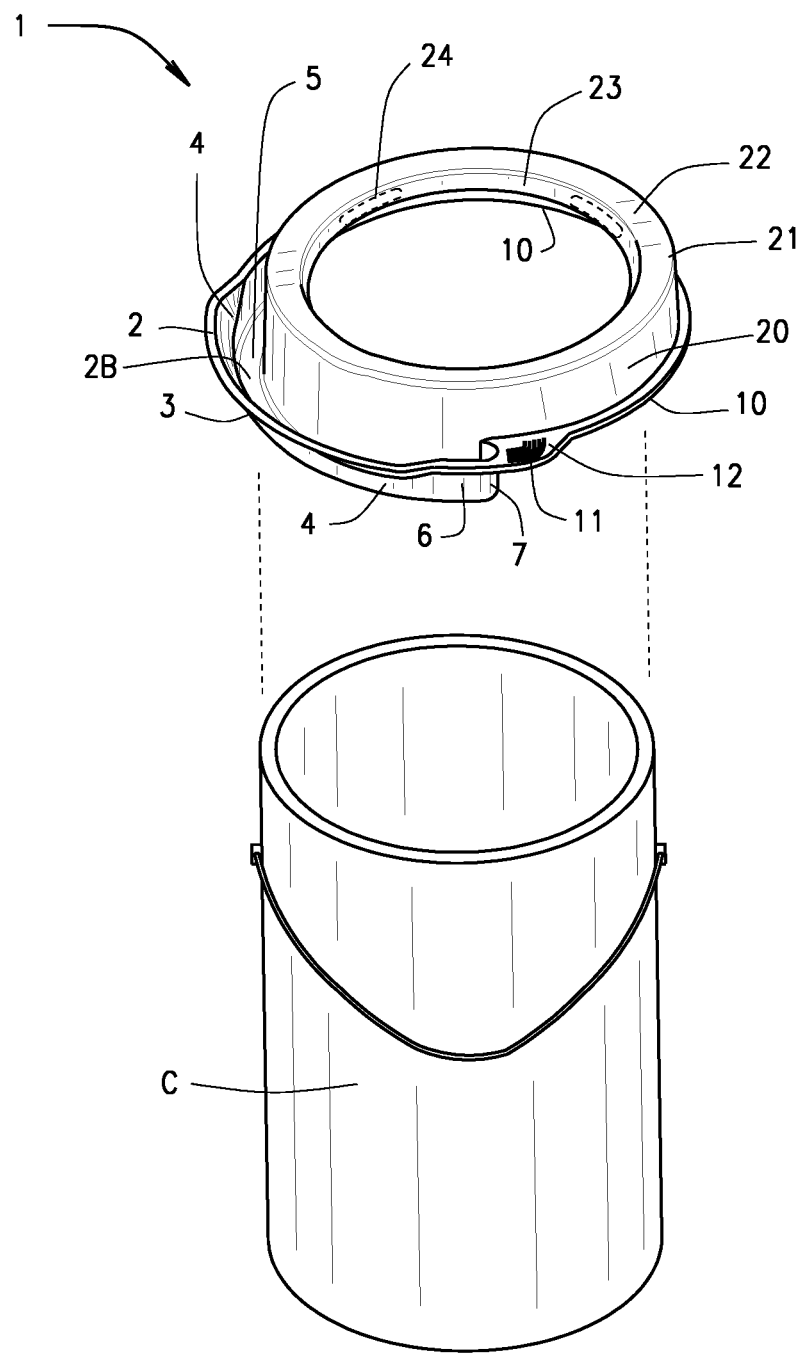
FIG. 12 is an exploded view of the invention during its usage.

After many references in the above description, FIG. 12 shows an exploded view of a paint can C about to receive The DripLip 1. The invention 1 has its upper flange 22 oriented upwardly in this view and has its inner rim 23 descending from it with two tabs 24 shown spaced around the inner rim, ready to grasp the paint can C. Opposite the inner rim, the outer flange 22 has its outer edge 21 the transitions to the main wall 20 that extends around the invention. For most of the distance around the main wall, a lower flange 10 extends slightly Outward.

For slightly less than half of the distance around the lower flange 10, the lower flange has its receptacle 5 beneath and Outward from it. The receptacle 5 has the upper portion 2 of greater width than the lower portion, thus extending Outward from the central portion of the receptacle. The upper portion has its forward wall 3 at an angle, or preferably a curve, away from the main wall 20. As the forward wall approaches the lower portion 2B of the receptacle 5, it has radial walls 4 of a triangular shape shown towards the upper right. Each terminus of the forward wall has a radial wall. The radial walls merge into the outer wall 6 and the outer wall descends to the base 8 of the receptacle 5. The receptacle has its rounded ends 7 that merge into the inner wall 9. The inner wall then extends upwardly from the base to the outer edge 21.

As before, the outer flange continues and transitions to the inner wall above the receptacle. During usage, a painter places The DripLip upon the lid channel of an opened paint can. The painter orients the upper portion 2 of the receptacle 5 in the desired direction of pour, typically away from the paint can's handle, similar to a spout. The painter then tips the paint can and pours as desired. With a pour completed, the painter turns the paint can upright for the key effect of the invention. That effect draws the nappe of residual paint against the forward wall and then into the upper portion and on into rest of the receptacle. The upper portion and lower portion combined of the receptacle have sufficient volume and space to contain at least three quarters of the typical nappes of residual paint. As before, the upper portion of the receptacle stacks vertically upon the lower portion of the receptacle. Another form of the paint retaining device has a receptacle of arcuate form or shape that has a lower portion and an upper portion stacked vertically upon the lower portion. The upper portion then has greater width than the lower portion as shown above in FIG. 11a. The device has a lower flange extending away in rotation from the upper portion, that is, to the left and to the right and the lower flange appears perpendicular to the lower portion, that is, sticking out. The device then has its main wall extending upward from the lower portion and along the lower flange as it extending substantially around the main wall, see FIG. 7. From there, this form of the device includes an outer edge transitioning the main wall to an upper flange and as the main wall has an annular form imparted to the whole device that rests upon a paint can during usage. The invention in this form then has an inner rim upon the upper flange opposite the outer edge. The invention, or device, during its usage guides a liquid outward over the inner rim and the upper flange, as in pouring, recovers a liquid from the upper flange, as in tipping a paint can upright, and the upper portion and the lower portion mutually retain a liquid within the receptacle after usage when a paint can returns to an upright position.

More particularly in this form, the upper portion has a forward wall bending, or in some instances at an incline, outward from the inner wall and two radial walls mutually spaced apart in rotation, that is, to the left and to the right, see FIGS. 6, 10, about the center of the paint retaining device. Each of the radial walls has its triangular shape extending outward form the receptacle. The upper portion has a height less than the lower portion. Then the outer edge and the inner rim each have their own curvature upon a radius perpendicular to the curvature of the device, that is, no sharp edge or corner. This allows the curvature of the outer edge and the inner rim to return a liquid into the receptacle, and the outer edge and the inner rim to impart little turbulence into a liquid flowing upon them. Thus, the outer edge and the inner rim attaining a smooth transition to the upper flange. In preparation for nesting of multiple inventions, the main wall forms a frusto-conical shape.

Another embodiment of the paint retaining device takes the form of a main wall forming a hollow round shape for the device or the invention, a circumference of the main wall, an upper flange upon the main wall and perpendicular to the main wall, and an inner rim of the upper flange extending within the main wall. The invention has a lower flange extending radially outward of the main wall and spaced beneath the upper flange. The main wall extends beneath the lower flange for a portion of the circumference of the main wall and forms a receptacle extending radially outward of the main wall where the receptacle has an arcuate form. As before, the receptacle has a lower portion and an upper portion stacked vertically upon the lower portion where the upper portion has greater width than the lower portion. The invention's upper flange has an annular form, an outer edge transitioning to the main wall, and the outer edge being spaced away from the inner rim. The invention, or device, during its usage guides a liquid outward over the inner rim and the upper flange, as in pouring, recovers a liquid from the upper flange, as in tipping a paint can upright, and the upper portion and the lower portion mutually retain a liquid within the receptacle after usage when a paint can returns to an upright position.

This other embodiment or form of the invention has its lower flange with two spaced apart shelves, the shelves spaced apart in rotation from the receptacle. Within the invention, it has four tabs upon the inner rim, equiangularly spaced as in FIG. 7, and extending mutually inward from the inner rim, that is, pointing towards the center of the invention. The outer edge and the inner rim each have their own curvature upon a radius perpendicular to the curvature of the device, thus preventing sharp edges and corners. This allows the curvature of the outer edge and the inner rim to return a liquid into the receptacle, and the outer edge and the inner rim to impart little turbulence into a liquid flowing upon them. Thus, the outer edge and the inner rim attaining a smooth transition to the upper flange. In preparation for nesting of multiple inventions, the main wall forms a frusto-conical shape.

The description above includes examples of the claimed subject matter. It remains beyond possible to describe every conceivable combination of components or methodologies for purposes of describing the claimed subject matter. But one of ordinary skill in the art may recognize that many further combinations and permutations of the claimed subject matter may become possible. Accordingly, the claimed subject matter embraces all such alterations, modifications, and variations that fall with the spirit and scope of the appended claims. Furthermore, to the extent that the term "includes" sees use in the detailed description and the claims, "includes" becomes inclusive in a manner similar to the term "comprising" as "comprising" has its interpretation when employed as a transition word in the appended claims.

The foregoing descriptions of specific embodiments of the present invention appeared for purposes of illustration and description. These descriptions need not exhaust all forms and limit the present invention to the precise forms disclosed, and many modifications and variations may take form in light of the above teaching. The exemplary embodiment described above became chosen and described in order to clearly explain the principles of the present invention and its practical application in industry, to thereby enable others skilled in the art to best utilize the present invention and its various embodiments with various modifications as suited to the particular use contemplated.

While a preferred embodiment of The DripLip has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. The DripLip may have steel, alloy, polymer, ceramic, or a composite material for its primary construction. For example, any suitable sturdy material such as plastic, polymer, metal, composite, or another variety of hybrid material may be used in any of the invention's components. The invention has a construction of a rugged, durable material that resists imparted torsion, impact loads, jams, water, groundwater, and petroleum products.

Although providing The DripLip, it should be appreciated that The DripLip herein described is also suitable for construction sites, oilfields, residential locations, commercial property, industrial plants, farms, ranches, warehouses, garages, select mines, and the like where The DripLip user can put them to work. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

We claim:

1. A paint retaining device adapted for placement on the top of a cylindrical paint can and coupling to the circular upper edge of the paint can, comprising:
   a receptacle of arcuate form to closely follow the contour of a side wall of the cylindrical paint can and to be at most spaced closely to the side wall of the cylindrical paint can, said receptacle including a lower portion and an upper portion stacked vertically upon said lower portion;
   said upper portion having a greater width than said lower portion;

a lower flange extending away in rotation from said upper portion, said lower flange being perpendicular to said lower portion;

a main wall extending upward from said lower portion and along said lower flange, said lower flange extending substantially around said main wall;

an outer edge transitioning said main wall to an upper flange and having an annular form;

an inner rim upon said upper flange opposite said outer edge;

said receptacle being lower than said upper flange; and wherein said paint retaining device is adapted to guide a liquid outward over said inner rim and said upper flange, wherein said paint retaining device is adapted to recover a liquid from said upper flange, and wherein said upper portion and said lower portion are adapted to mutually retain a liquid within said receptacle.

2. The paint retaining device of claim 1 further comprising:

said lower flange having two circumferentially spaced apart shelves, said lower flange is adapted to be oriented outward from the cylindrical paint can, said lower flange widening into said shelves; and four tabs upon said inner rim, equiangularly spaced, and extending mutually outward from said inner rim, said tabs having a length oriented parallel to said inner rim.

3. The paint retaining device of claim 2 further comprising:

each of said shelves having grips thereon, wherein said grips are is adapted to promote a user grasping said paint retaining device.

4. The paint retaining device of claim 1 further comprising:

said upper portion including a forward wall bending outward from a center of said device and two radial walls mutually spaced apart in rotation about the center of said paint retaining device;

each of said radial walls having a triangular shape extending outward form said receptacle; and said upper portion having a height less than said lower portion.

5. The paint retaining device of claim 4 further comprising:

said lower portion including an outer wall, said outer wall receiving said forward wall and said radial walls of said upper portion, an inner wall spaced apart from said outer wall, said inner wall extending upwardly and merging into said main wall, two rounded ends mutually spaced apart in rotation about the center of said paint retaining device, each of said rounded ends spanning from said inner wall to said outer wall, and a base spanning between said inner wall, said outer wall, and said rounded ends; and said lower portion having a length partially around said device and greater than that of said upper portion, wherein said upper portion and said lower portion are adapted to receive a liquid across each's entire width from said main wall.

6. The paint retaining device of claim 5 further comprising:

said outer edge and said inner rim each having their own curvature upon a radius perpendicular to the curvature of said device, wherein the curvature of said outer edge and said inner rim are adapted to return a liquid into said receptacle, and wherein said outer edge and said inner rim are adapted to impart little turbulence into a liquid flowing upon them.

7. The paint retaining device of claim 6 further comprising:

said outer edge and said inner rim attaining a smooth transition to said upper flange; and said main wall forming a frusto-conical shape.

8. A paint retaining device adapted for placement on the top of a cylindrical paint can and coupling to the circular upper edge of the paint can, comprising:

a main wall forming a hollow round shape, a circumference of said main wall, an upper flange upon said main wall and perpendicular to said main wall, and an inner rim of said upper flange extending within said main wall;

a lower flange extending radially outward of said main wall and spaced beneath said upper flange;

said main wall extending beneath said lower flange for a portion of the circumference of said main wall and forming a receptacle extending radially outward of said main wall, said receptacle having arcuate form to closely follow the contour of a side wall of the cylindrical paint can and to be at most spaced closely to the side wall of the cylindrical paint can;

said receptacle including a lower portion and an upper portion stacked vertically upon said lower portion;

said receptacle being lower than said upper flange;

said upper portion having a greater width than said lower portion;

said upper flange having an annular form, an outer edge transitioning to said main wall, and said outer edge being spaced away from said inner rim; and wherein said paint retaining device is adapted to guide a liquid outward over said inner rim and said upper flange, wherein said paint retaining device is adapted to recover a liquid from said upper flange, and wherein said upper portion and said lower portion are adapted to mutually retain a liquid within said receptacle.

9. The paint retaining device of claim 8 further comprising:

said lower flange having two circumferentially spaced apart shelves, said lower flange is adapted to be oriented outward from the cylindrical paint can, said lower flange widening into said shelves; and four tabs upon said inner rim, equiangularly spaced, and extending mutually outward from said inner rim, said tabs orienting parallel to said inner rim; and each of said shelves having grips thereon.

10. The paint retaining device of claim 8 further comprising:

said lower portion including an outer wall following said main wall extending beneath said lower flange as an inner wall spaced apart from said outer wall, two rounded ends mutually spaced apart, each of said rounded ends spanning from said inner wall to said outer wall, and a base spanning between said inner wall, said outer wall, and said rounded ends;

said upper portion including a forward wall inclined away from said inner wall and two radial walls mutually spaced, each of said radial walls having a triangular shape extending away from said inner wall and said upper portion having a greater width than said lower portion;

said upper portion having less length than said lower portion; and said receptacle having a length less than half of a circumference of said main wall, wherein said upper portion and said lower portion are adapted to receive a liquid across each's entire width from said main wall; and said outer edge and said inner rim each having their own curvature upon a radius perpendicular to the curvature of said device, wherein the curvature of said outer edge and said inner rim are adapted to return a liquid into said receptacle, and wherein said outer edge and said inner rim are adapted to impart little turbulence into a liquid flowing upon them.

11. The paint retaining device of claim 10 further comprising:

said outer edge and said inner rim attaining a smooth transition to said upper flange; and said main wall forming a frusto-conical shape.

12. The paint retaining device of claim 11 wherein said main wall forms said paint retaining device into annular form and said main wall is adapted to fit upon a paint can.

* * * * *